United States Patent
Schuster et al.

(10) Patent No.: US 8,469,266 B2
(45) Date of Patent: *Jun. 25, 2013

(54) BANKING SYSTEM CONTROLLED RESPONSIVE TO DATA BEARING RECORDS

(71) Applicant: Diebold, Incorporated, North Canton, OH (US)

(72) Inventors: Ray Schuster, Lowellville, OH (US); Dolar Harshadrai Vaishnav, Brewster, OH (US); Bill A. Cole, Massillon, OH (US); Pedro Tula, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,408

(22) Filed: Nov. 12, 2012

(65) Prior Publication Data

US 2013/0062407 A1     Mar. 14, 2013

Related U.S. Application Data

(60) Continuation of application No. 13/066,867, filed on Apr. 27, 2011, now Pat. No. 8,308,057, which is a division of application No. 10/269,470, filed on Oct. 11, 2002, now abandoned.

(60) Provisional application No. 60/328,812, filed on Oct. 12, 2001.

(51) Int. Cl.
    *G06Q 40/00*     (2012.01)

(52) U.S. Cl.
    USPC .......................................................... 235/379

(58) Field of Classification Search
    USPC ....................................... 235/379; 705/39–45
    See application file for complete search history.

(56) References Cited

U.S. PATENT DOCUMENTS

| | | | |
|---|---|---|---|
| 6,286,756 B1 * | 9/2001 | Stinson et al. | 235/379 |
| 6,474,547 B1 * | 11/2002 | Suzuki | 235/379 |
| 6,527,171 B1 * | 3/2003 | Brooks et al. | 235/379 |
| 7,711,643 B2 * | 5/2010 | Nielsen et al. | 705/43 |
| 2002/0062281 A1 * | 5/2002 | Singhal | 705/39 |
| 2006/0038004 A1 * | 2/2006 | Rielly et al. | 235/379 |
| 2010/0332388 A1 * | 12/2010 | Rielly et al. | 705/43 |

\* cited by examiner

*Primary Examiner* — Tuyen K Vo
(74) *Attorney, Agent, or Firm* — Christopher L. Parmelee; Ralph E. Jocke; Walker & Jocke

(57) ABSTRACT

An automated banking machine operates to cause financial transfers responsive to data read from data bearing records. The automated banking machine includes a card reader operative to read card data from user cards corresponding to financial accounts. The automated banking machine includes a display and a printer to produce records of financial transactions carried out with the machine. The automated banking machine is operative to output a visual and audible user interface which enables a consumer to operate the machine. The exemplary machine may output secure verbal instructions through a wireless headphone placed in operative connection with the machine.

20 Claims, 9 Drawing Sheets

BANKING SYSTEM CONTROLLED RESPONSIVE TO DATA BEARING RECORDS

TECHNICAL FIELD

This invention relates to automated banking machines that operate to cause financial transfers responsive to data read from data bearing records and which may be classified in U.S. Class 235, Subclass 379.

BACKGROUND

Automated banking machines enable customers to carry out banking transactions. Common banking transactions that may be carried out with automated banking machines include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers checks. For purposes of this disclosure references to an automated banking machine, an automated teller machine, or an automated transaction machine shall encompass any device which carries out transactions including transfers of value.

Automated banking machines generally include a display device which is operative to output a visual user interface. The user interface includes instructions and selectable options which visually guide a user through the operation of the machine. For example, automated banking machines often include a hierarchical menu for navigating through a plurality of different user interface screens. Such menus often list various types of transaction functions which may be performed at the automated banking machine such as a withdrawal of cash or the deposit of a check. Although a consumer with normal vision can readily operate such an automated banking machine by following the commands visually presented through the display device, a consumer who is visually impaired may not be able to operate such an automated banking machine as easily. As a result there exists a need for an automated banking machine which is capable of being operated by consumers with either normal or impaired vision.

OBJECTS OF EXAMPLE EMBODIMENTS

It is an object of an exemplary embodiment to provide an automated banking machine at which a user may conduct transactions.

It is a further object of an exemplary embodiment to provide an automated banking machine that may be operated by consumers with normal vision.

It is a further object of an exemplary embodiment to provide an automated banking machine that may be operated by consumers with impaired vision.

Further objects of exemplary embodiments will be made apparent in the following Detailed Description of Example Embodiments and the appended claims.

The foregoing objects are accomplished in an exemplary embodiment by an automated banking machine that includes output devices such as a display screen, and input devices such as a touch screen, a keyboard, a card reader or other type of input device. The banking machine may further include devices such as a cash dispenser mechanism for sheets of currency, a printer mechanism, a depository mechanism and other transaction function devices that are used by the machine in carrying out banking transactions.

The banking machine is in operative connection with at least one computer. The computer is in operative connection with the output devices and the input devices, as well as with the cash dispenser mechanism, and other physical transaction function devices in the banking machine. The computer includes software programs that are executable therein. The software may include terminal control software which is operative to cause the machine to perform a plurality of different transaction functions. In addition the terminal control software of the exemplary embodiment may be operative to cause the machine to provide both a visual and audible user interface for guiding a consumer through the operation of the machine.

In one exemplary embodiment, the terminal control software may be operative to cause the computer to output a visual menu for navigating between different user interface screens. Such screens may include transaction information and selectable options for operating the automated banking machine. For each visual user interface screen, the exemplary embodiment of the terminal control software may be operative to cause the computer to output corresponding audible outputs through external loudspeakers and/or an output device that is connectable to a set of headphones. The audible outputs may include verbal instructions which describe the functions and operations available for the current state of the banking machine. Such audible verbal instructions may further include a description of which keys, buttons, transaction function devices, and other input devices to press, manipulate, or activate in order to perform the available machine functions and operations. In addition, such audible verbal instructions may further include a description of the relative locations of the keys, buttons, transaction function devices, and other input devices for performing the functions and operations. Further, such verbal instructions may include a description of how to use or manipulate the keys, buttons, transaction function devices, and other input devices of the banking machine. For example, to initially activate the automated banking machine, the audible verbal instructions may include a description of the location of a card reader of the machine and indicate in what orientation a card may be inserted and/or swiped in the card reader for purposes of being read. Further audible verbal instructions may describe the types of transaction functions that are available and which keys or other input devices must be pressed or manipulated in order to either select, modify, or cancel each of the transaction functions.

As used herein the term verbal corresponds to spoken human language words generated by either a human voice or machine synthesized human voice emulation. In exemplary embodiments, audible verbal instructions may include a plurality of spoken words produced responsive to digital or analog recordings of either a human voice or computer synthesized voice. In addition, audible verbal instructions may be produced directly from hardware devices and/or software programs operating in the automated banking machine which are capable of synthesizing human language words, sentences, syllables and other human language communication sounds. Such hardware devices and/or software programs for example may include text to speech synthesizer devices which are operative to generate sound signals or audible outputs which include verbal instructions responsive to alphanumeric text.

The exemplary embodiment may include a plurality of features which enable the machine to be easily and conveniently used by the visually impaired. For example, in the exemplary embodiment, the automated banking machine may enable a consumer to repeat the last audible verbal instructions with the press of a single button and/or key. Also, for each key press or other input, the banking machine may be operative to audibly identify the letter, number, and/or function of the key.

In the exemplary embodiment, the automated banking machine may enable the consumer to cycle through a plurality of volume changes with the press of a single button and/or key. Further the banking machine may be operative to automatically mute any external loudspeakers of the banking machine upon the detection of the operative connection of headphones to the machine by a user. In addition, the exemplary embodiment of the banking machine may be operative to set the headphone volume at a predetermined low level with each new consumer session. The consumer may then press the volume key and/or button to increase the volume level of the headphones to a desirable level.

The exemplary embodiment may include a new audio system which enables the automated banking machine to have one or more of the previously described audible features. The new audio system may be operative to accept and adjustably mix together inputs from a plurality of audio sources, including multimedia inputs such as MPEG streams, voice inputs such as from WAV files, and system keyboard and/or prompting beeps. An exemplary embodiment of the audio system may further include both external and headphone connection ports which are operative to individually and selectively amplify and output the mixed signals through external loudspeakers and headphones placed in operative connection with connection ports.

The audio system may be operative to detect the connection of a headphone to the headphone port, automatically mute the output to the external port which is connected with external speakers, and set the headphone volume at a minimum level. In addition, the exemplary audio system may be operative to detect the removal of the headphone from connection with the headphone port, and automatically reinstitute the output through the external port.

In the exemplary embodiment, the new audio system may further be operative to selectively step through a plurality of headphone volume levels responsive to one or more volume changing inputs. Such inputs may be directly received from a key or button in operative connection with the new audio system. In alternative exemplary embodiments of the audio system, signals corresponding to a volume change may be received from one or more buttons of the banking machine.

This application is a divisional of application Ser. No. 10/269,470 filed Oct. 11, 2002, which claims benefit pursuant to 35 U.S.C. §119(e) of provisional application No. 60/328,812 filed Oct. 12, 2001, the disclosures of each of which are incorporated herein by reference in their entirety.

DETAILED DESCRIPTION OF EXAMPLE EMBODIMENTS

Figure 1:
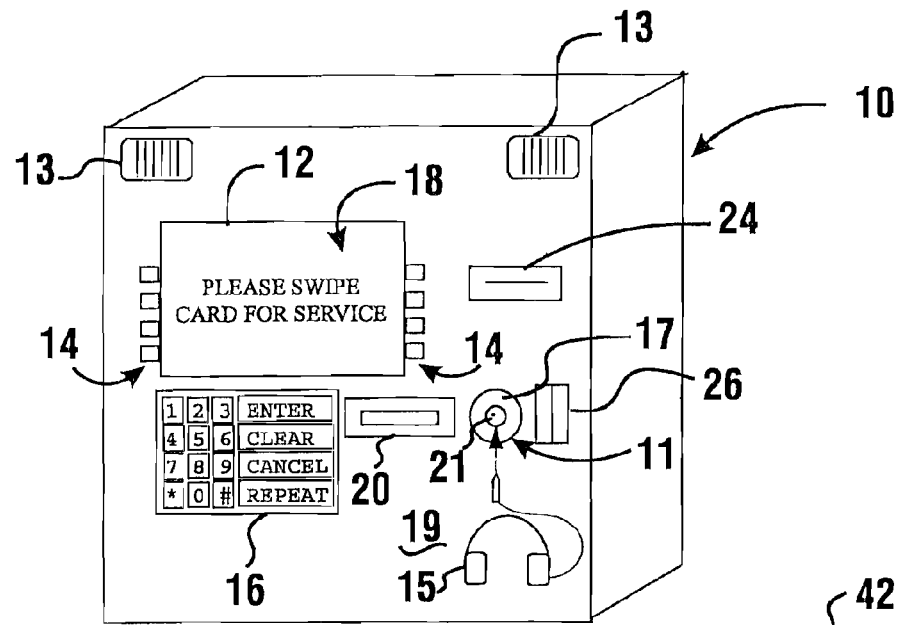
FIG. 1 is a perspective view representative of an exemplary embodiment of an automated banking machine.

Referring now to the drawings and particularly to FIG. 1, there is shown therein a perspective view of an exemplary automated banking machine such as an automated teller machine 10 including certain features of the exemplary embodiments. The exemplary embodiment of the automated banking machine 10 includes output devices such as a display device 12 and external loudspeakers 13. The display device 12 is operative to provide a consumer with a user interface 18 that includes a plurality of screens or other outputs including selectable options for operating the machine. The external loudspeakers 13 may be operative to provide a consumer with audible music, beeps, signals, and/or verbal instructions for operating the machine.

The exemplary embodiment of the automated banking machine 10 may further include at least one output device such as an external port 11. In the exemplary embodiment of the automated banking machine 10, the external port 11 includes a speaker port such as a headphone port 21 for operatively connecting portable speaker devices such as a set of headphones 15 to the automated banking machine. In other exemplary embodiments, the external port 11 may comprise a wireless connection port. For example in an alternative exemplary embodiment of the automated banking machine 10, the external port 11 may include a wireless communication device which is operative to communicate with a wireless headphone set or other external device capable of providing audible, visual or other user perceivable outputs. Such wireless communication devices may communicate with the external device using RF or IR, for example.

In the exemplary embodiment, the external port 11 may include a base 17 with a useful shape that is not flush with the fascia 19 of the automated banking machine 10. The shape of the base 17 may have a distinctive contour which enables a consumer with impaired vision to quickly locate the external port by touching the fascia 19 and base 17 of the automated banking machine. For example in one exemplary embodiment, the base of the external port may include a concave portion with a female headphone jack or port 21 positioned generally in the center of the concave portion. In further exemplary embodiments, the base 17 of the external jack may extend from the fascia 19 and have a distinctive contour or edge shape such as that of a square, circle, triangle, or other unique shape that is identifiable by touch.

The exemplary automated banking machine 10 may include a plurality of input devices such as function keys 14 and a keypad 16. The exemplary embodiment of the automated banking machine 10 may further include other types of input devices, such as a touch screen, microphone, card reader 26, biometric reader or any other device that is operative to provide the automated banking machine with inputs representative of user instructions or information. The exemplary automated banking machine 10 may further include a plurality of transaction function devices, such as a sheet or cash dispenser 20, receipt printer 24 and other devices.

Figure 2:
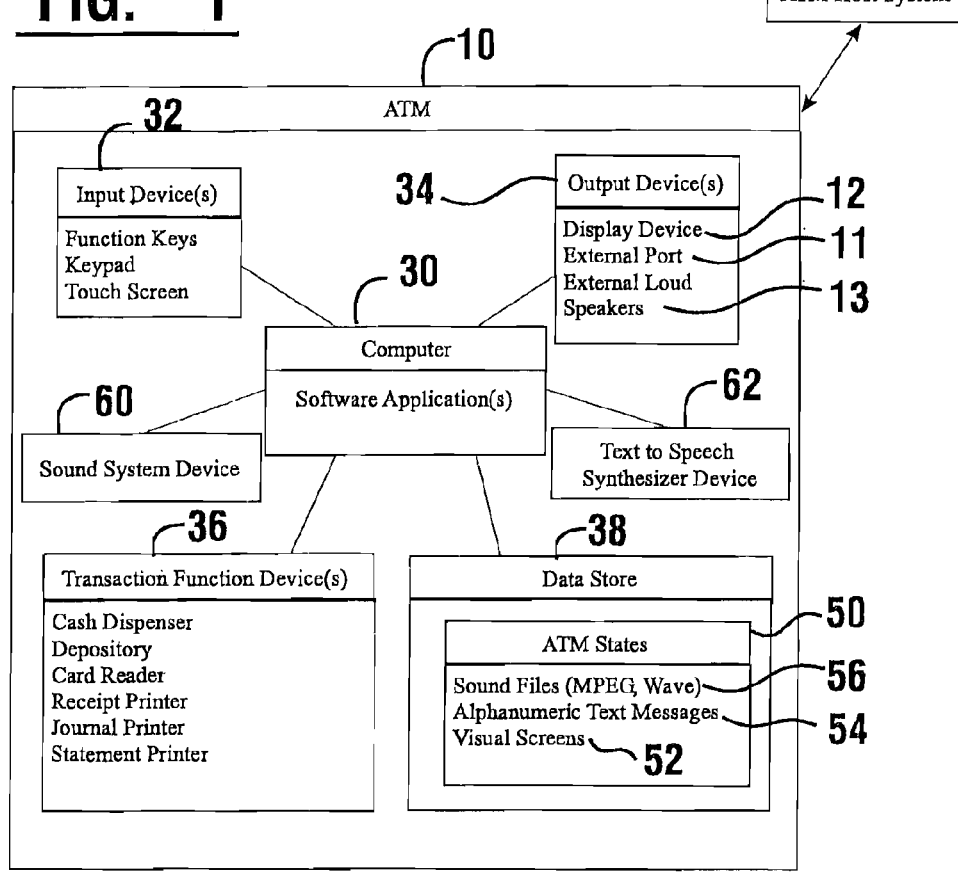
FIG. 2 is a schematic view of the exemplary embodiment of the automated banking machine.

FIG. 2 shows a schematic view of components which may be included in an exemplary embodiment of the automated banking machine and a system in which it is operated. The automated banking machine 10 may include at least one computer 30. The computer 30 may be in operative connection with the input device(s) 32, the output device(s) 34, the transaction function device(s) 36 and at least one data store 38. The exemplary embodiment further includes one or more software application(s) 40 operative in the computer 30. The software applications may include for example terminal control software, maintenance software, diagnostic software and any other software that enables the automated banking machine to perform transaction functions for users and/or enables authorized representatives of an operator of the automated banking machine to service, configure and maintain the automated banking machine. An exemplary embodiment of an automated banking machine may be operative to communicate with a host banking system 42 to enable a consumer to perform such exemplary transaction functions as withdrawing cash from an account through operation of the cash dispenser device 20, depositing checks or other items with the depository device, performing a balance inquiry for a financial account and transferring value between accounts.

The exemplary embodiment may be operative to provide a consumer with a user interface that may be visually displayed and/or output in audible form for the consumer. The exemplary user interface may guide the consumer through the selection of one or functions which are to be performed by the automated banking machine. Such functions may include a plurality of different transaction functions such as the dispense of cash, balance inquiries, deposits and transfers. However, such functions may also include options for navigating through the user interface such as functions for canceling or confirming a selection. Functions may also include options for configuring the user interface, such as changing the human language output through the user interface or changing the volume of the audio output of the automated banking machine. In addition, functions may also include options for making the user interface more user friendly, such as functions that repeat an audible instruction, or that provide help or a description for other functions of the automated banking machine.

The exemplary embodiment of the automated banking machine includes at least one software application such as a terminal control software program that at any given time is operative to be in one of a plurality of different states. To perform transaction functions, the terminal control software may progress between the various states, prompting the user to input different types of information in some states and performing a transaction function in other states in response to the inputted information.

The exemplary embodiment of the automated banking machine may operate to organize different transaction functions into a hierarchy using a plurality of menus and sub-menus. A menu may be visually and/or audibly output to the consumer for each of the different states the automated banking machine is operative to progress through to select and perform the transaction functions. Each menu may be operative to list those functions which may be performed in any given state of the automated banking machine. Selecting an option or function visually listed or verbally described in a menu may cause the automated banking machine to change to a different state which causes a display and/or output of an audible verbal description of a sub-menu of options or functions available to be performed by the automated banking machine in the new state.

The exemplary data store 38 of the automated banking machine may be operative to store therein, information for generating visual outputs and audible outputs that are representative of menus and submenus for a plurality of different states 50 of the automated banking machine. Such information for example may include stored data for producing visual outputs such as visual screen data 52 for operative states of the automated banking machine. Such information may further include stored data for producing audio outputs such as MPEG or WAV sound files 56 which include verbal instructions for operative states of the automated banking machine. Such stored data for producing audio outputs may also include alphanumeric text messages 54 which may be used by the computer 30 to generate audible verbal instructions for operative states of the automated banking machine. In exemplary embodiments, the visual screen data 52 and/or text messages 54 may be accessed by the computer and used to produce visual outputs through the display device 12. The sound files 56 and/or text messages 54 may be accessed by the computer and used to produce audible outputs with verbal instructions or descriptions through external loudspeakers 13 and/or headphones.

As shown in FIG. 2, the automated banking machine 10 may further include a sound system device 60 in operative connection with the computer. The exemplary sound system device 60 may be operative to produce signals that produce audible outputs. Such signals may be directed to the external port 11 and/or the external loudspeakers 13. In one exemplary embodiment, the sound system device may be operative to selectively mix and amplify a plurality of different audio input signals to generate an amplified audible output signal. Alternative exemplary embodiments of the automated banking machine 10 may further include a text to speech synthesizer device 62 which is operative to convert the text messages 54 into the verbal instructions or descriptions included in the audible outputs of the automated banking machine.

The exemplary embodiment of the automated banking machine 10 may be designed to be used by consumers with normal vision as well as users who have impaired vision or who are blind. For example, a user with normal vision may view the display screen to read instructions for operating the automated banking machine 10. A user with impaired vision may listen to verbal instructions and descriptions output from the external loudspeakers 13. In addition, a user with impaired vision may operatively connect a personal set of headphones 15 or other device with the external port 11 of the automated banking machine to listen to verbal instructions and descriptions in private.

In an exemplary embodiment, the sound system device 60 may be operative to detect the impedance change across the external port 11 when headphones 15 are electrically connected to the external port. When the connection is detected, the sound system device 60 and/or computer 30 may be operative to mute any audible output being directed to the external loudspeakers 13. The computer may then be operative to output private verbal instructions through the headphones which describe to the user how the automated banking machine may be operated. In exemplary embodiments, muting an audible output may include the computer or the sound system device operating to lower the volume level of the audible output through the external speakers to a generally silent level. Muting an audible output may also include stopping the playing or production of audio outputs by the computer or the sound system device.

Upon detection of the connection of the headphones or other external device to the external port, the sound system and/or the computer may be operative to change the volume level of the audible output being directed to the headphones or other device through the external port to a predetermined level. Such a predetermined level may correspond to a relatively low volume level that is not likely to cause discomfort to the majority of consumers using the automated banking machine. In the exemplary embodiment, the sound system may be in operative connection with one or more volume changing switches, keys, or buttons which are accessible to the consumer. After the operative connection of the headphones or other device to the external port, the volume changing buttons may be operated by the consumer to increase or decrease the volume level as desired by the consumer. In an exemplary embodiment, the sound system device may further be operative to detect when the headphone has been disconnected with the external port. When this occurs the sound system and/or the computer may be operative to mute the audible output to the external port and institute the audible output through the external loudspeakers.

In alternative exemplary embodiments, a key of a keypad of the automated banking machine may be operative to control the volume of audio outputs. When a designated volume key of the keypad or other key is pressed or actuated, the computer may be operative to cause the automated banking machine to change the current volume level and audibly output a word such as 'Volume' at the newly selected volume level. For example, when a consumer presses the volume key of the keypad twice in succession, an exemplary embodiment of the banking machine may be operative to output the word 'Volume' twice with the second occurrence of the word 'Volume' being louder than the first occurrence. When the volume has reached a maximum level, the next time the volume key of the keypad is pressed, the exemplary automated banking machine may be operative to return the volume level to a predetermined minimum usable volume level and output a word such as 'Volume' at the corresponding minimum volume level.

Figure 3:
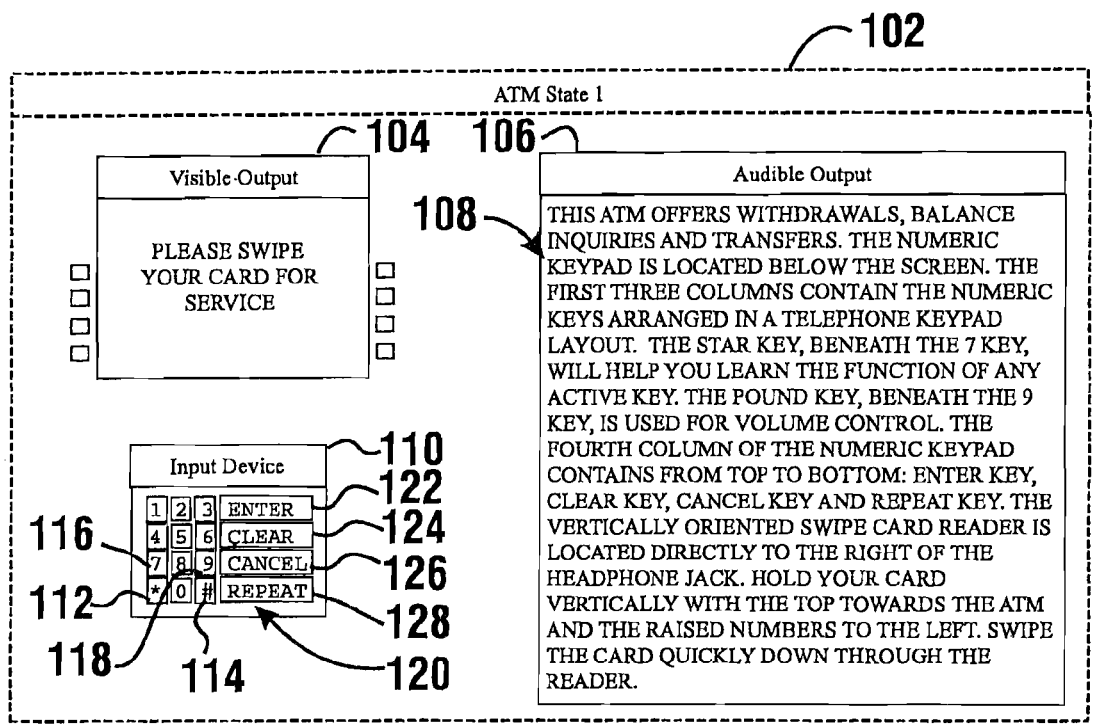
FIGS. 3-13 are schematic views of the exemplary embodiment of the automated banking machine in a plurality of different states of operation.

FIGS. 3-8 show schematic views of the automated banking machine 10 in a plurality of different states. Such states are examples of one exemplary path a consumer may take through the hierarchy of user interface menus for purposes of operating the automated banking machine 10. FIG. 3 shows the automated banking machine 10 in a first mode or state 102 which may be active when a user first approaches the machine. Here the automated banking machine is operative to attract or invite consumers to use the services of the automated banking machine. The exemplary embodiment of the automated banking machine may include a visible output 104 through a display device of the automated banking machine. The visible output may include indicia such as text which informs the consumer that the card may be swiped for initiating operation of the machine.

For users that are visually impaired, the exemplary automated banking machine may further be operative to output an audible output 106 through external loudspeakers or headphones of the consumer. Such an audible output 106 may include verbal instructions 108 which inform the consumer which types of transaction functions can be performed at the machine. The verbal instructions 108 may also describe the locations of input devices such as a keypad 110 of the automated banking machine and may describe the physical locations and/or configurations of the input devices. In addition the output verbal instructions may describe how the input device may be manipulated to select different functions of the machine and may further describe what the functions perform. Also, the verbal instructions may describe the location of transaction function devices and describe how the transaction function devices may be used.

For example in the state shown in FIG. 3, the output audible verbal instructions may indicate that the automated banking machine offers transaction functions such as withdrawals, balance inquiries and transfers. In addition the verbal instructions may indicate that the keypad 110 is located below the display screen. Further, the verbal instructions may indicate that the keypad is organized similar to a telephone keypad. Also, the verbal instructions may describe the locations of certain keys of the keypad, including their function. For example, the star "*" key 112 may be indicated to be below the seven "7" key 116 and is operative to help the consumer learn the function of any active key. The pound "#" key 114 may be indicated to be below the nine "9" key 118 and is used for volume control. A fourth column 120 of keys in the exemplary keypad may be described as including from top to bottom an enter key 122, a clear key 124, a cancel key 126, and a repeat key 128. The exemplary output verbal instructions 108 may further indicate that the swipe card reader is vertically orientated and is located to the right of the headphone jack. Exemplary audible outputs may also indicate that the swipe reader is to be used by holding a credit or debit card vertically with the top toward the automated banking machine and with the raised numbers to the left and by swiping the card quickly down through the slot in the reader. Of course these outputs are exemplary and in other embodiments other approaches may be used.

Figure 4:
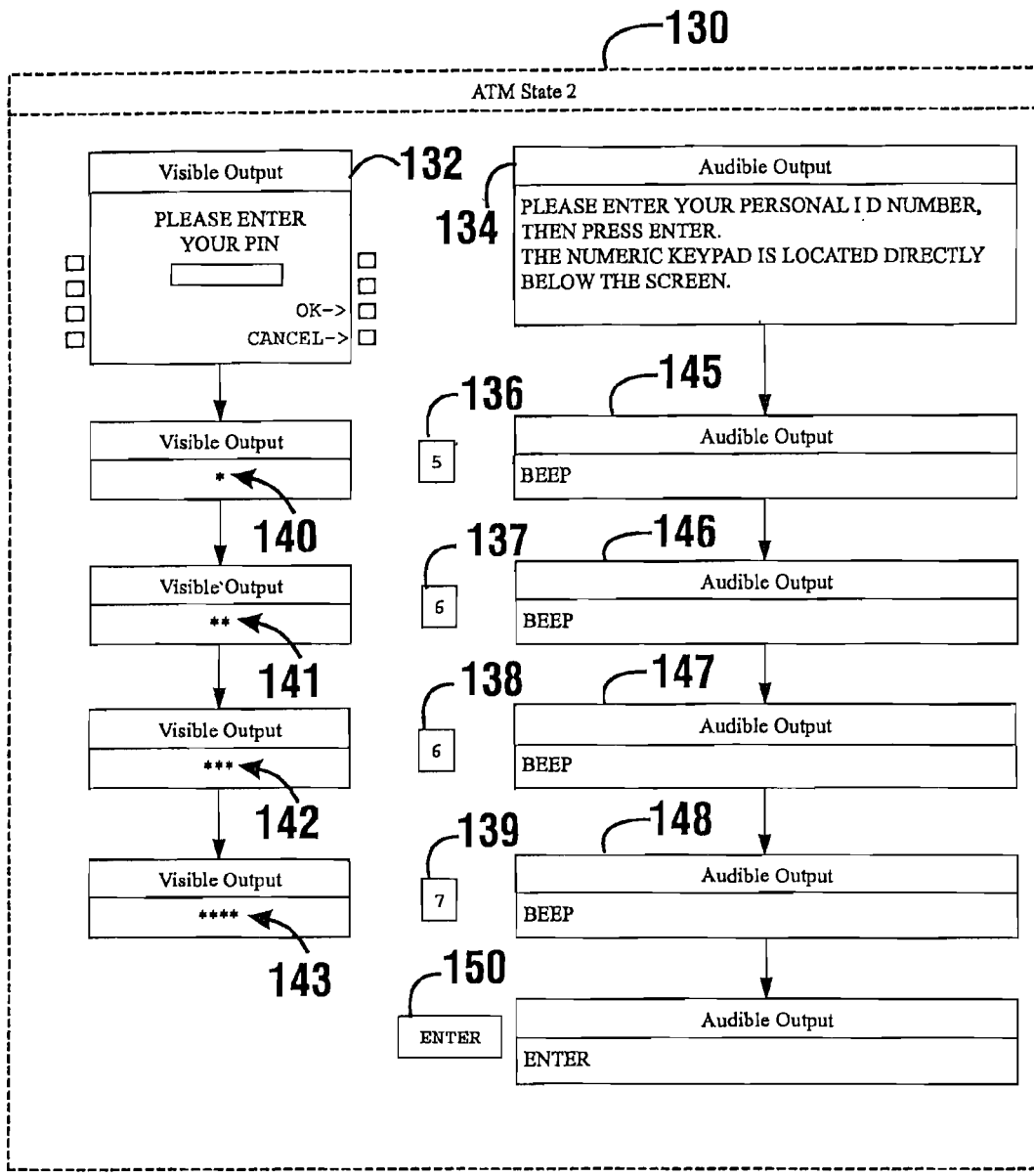

As shown in FIG. 4, the exemplary automated banking machine may be operative to change to a second state 130, after the consumer successfully swipes and/or inserts a card using the card reader of the automated banking machine. In this second state 130, the automated banking machine may be operative to accept the input of a Personal Identification Number (PIN). Both the visible output 132 and the audible output 134 produced when the automated banking machine is in this state, may request that the consumer enter a PIN. As a consumer presses each of the numeric keys 136-139 of the keypad which correspond to the consumer's PIN, the exemplary automated banking machine may be operative to both visually and audibly acknowledge each input. For example the visible output 132 may be updated with each key press to display an additional asterisk symbol 140-143. In addition, with each key press the automated banking machine may be operative to produce additional audible outputs 145-148 which may include a beep, or other sound acknowledging each input. When the audible output is privately being communicated to the user through headphones for example, the audible outputs 145-148 may correspond to the verbal description of each number being pressed. When the user presses the enter key 150, the exemplary automated banking machine is operative to produce a further audible output which includes a verbal description representative of the enter key such as for example the word "ENTER."

Figure 5:
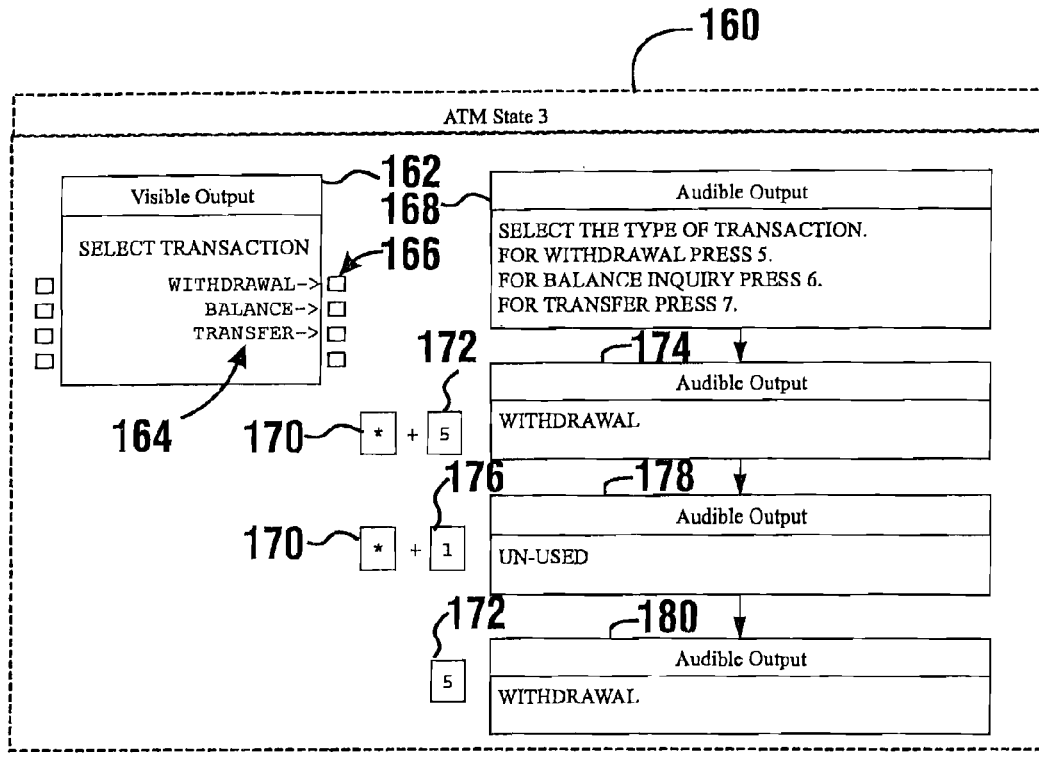

Once the consumer inputs a PIN and presses the enter key 150 of the keypad, the exemplary automated banking machine may be operative to change to a third state in which the automated banking machine is operative to enable the consumer to select one of a plurality of transaction functions to be performed with the automated banking machine. As shown in FIG. 5, when the automated banking machine is in a third state 160 the automated banking machine may produce a visible output 162 which lists the transaction functions 164 and visually points to the function keys 166 that are operative to select each transaction function.

In the exemplary automated banking machine, this described third state may cause the computer in the automated banking machine to produce audible outputs 168 which describe which keys of the keypad are operative to select certain transaction functions. For example, in this described embodiment it may be indicated that the five "5" key may be actuated to select a withdrawal, the six "6" key may be actuated to select a balance inquiry, and the seven key "7" may be actuated to select a transfer.

In the exemplary embodiment, the automated banking machine may be operative to provide a consumer with help to learn which keys perform which functions. For example, if the consumer wishes to verify that the five "5" key corresponds to a withdrawal transaction function without actually selecting a withdrawal transaction function, the consumer may press the star "*" key of the keypad prior to pressing the five "5" key. In this described exemplary embodiment the star "*" key may indicate to the automated banking machine that the next following key is to be verbally described or named. As shown in FIG. 5, when the consumer presses the star "*" key 170 followed by the five "5" key 172, the automated banking machine may be operative to produce a further audible output 174 which verbally indicates the name of the function such as "Withdrawal." When a help key such as the star "*" key 170 is actuated in this embodiment, the automated banking machine may only describe the function associated with the next key press rather than changing to a further state corresponding to such a key press.

If the consumer presses the star "*" key 170 followed by a key that is not associated with a function in the current state, such as the one "1" key 176, the exemplary automated banking machine may be operative to produce a further audible output 178. The further audible output may verbally indicate that the key is not being used in the current state of the automated banking machine with an expression such as "Unused."

In an exemplary embodiment, the second key for which the user wishes to receive an indication of the function must be pressed within a predetermined time period after the star "*" key 170 is pressed. Such a time period may for example be ten seconds. Of course these approaches are exemplary and in other embodiments other approaches may be used.

Figure 6:
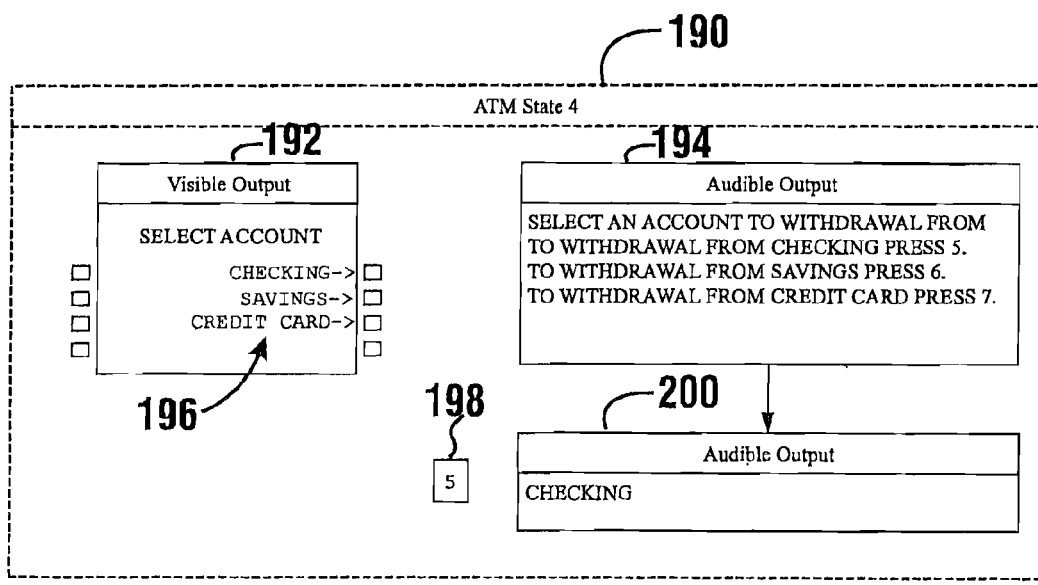

In the exemplary embodiment, when a consumer selects a transaction by pressing a key associated with the transaction, such as the five "5" key 172 without pressing the star "*" key 170, the automated banking machine may be operative to change to a fourth state and produce another audible output 180 which verbally indicates to the user the name of the selected function. As shown in FIG. 6, the fourth state 190 may include a verbal and an audible request that the consumer select or input additional information associated with the performance of the selected transaction function. With a withdrawal transaction, the fourth state may include a visible output 192 which lists the type of accounts 196 that the consumer may select for purposes of making the withdrawal. An audible output 194 may likewise verbally output a list of the types of accounts along with a corresponding key of the keypad to press for selecting each account. As discussed previously, when the consumer selects a key, the exemplary automated banking machine may be operative to produce a further audible output 200, which verbally describes what the consumer has selected. For example, if the consumer presses the five "5" key 198, the audible output 200 may indicate the name of the selection by outputting a word such as "Checking"

Figure 7:
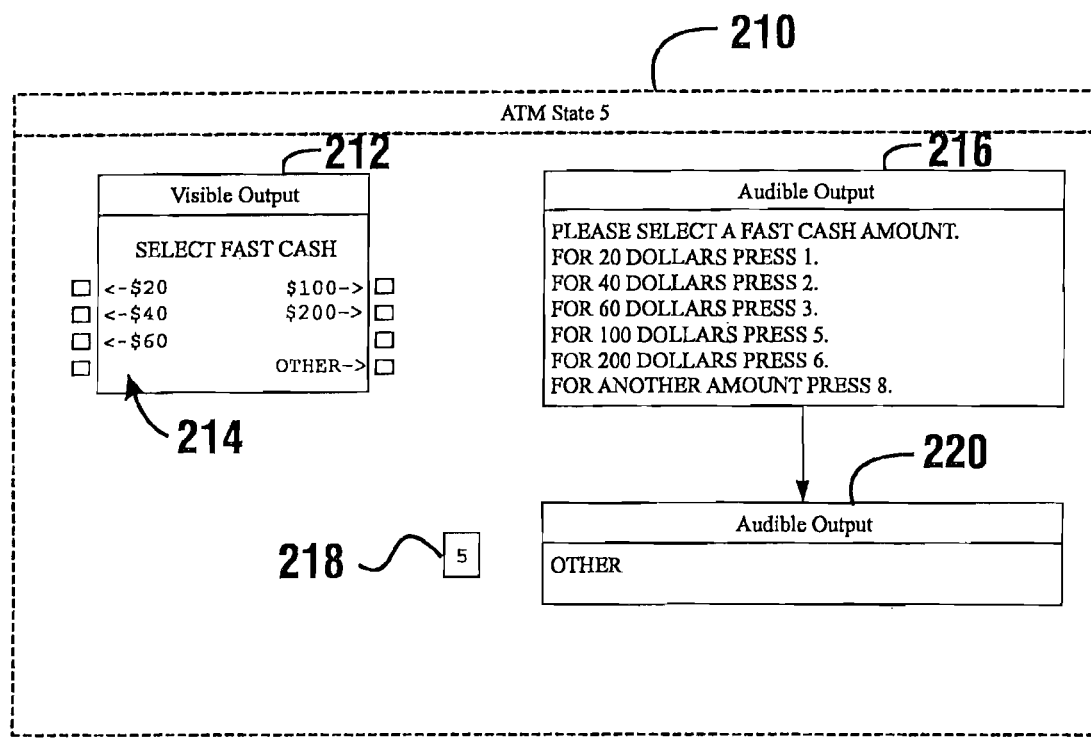

For a withdrawal transaction function, the exemplary embodiment may change to a further state after a selection of an account has been made. FIG. 7 shows an example of a fifth state 210, in which the automated banking machine may be operative to accept the selection of an amount of cash to be withdrawn. Here the automated banking machine may be operative to produce a visible output 212 which lists a plurality of currency amounts 214 which may be selected. Likewise, the automated banking machine may be operative to produce an audible output 216 which verbally indicates which keys of the keypad to press in order to select a particular currency amount.

Figure 8:
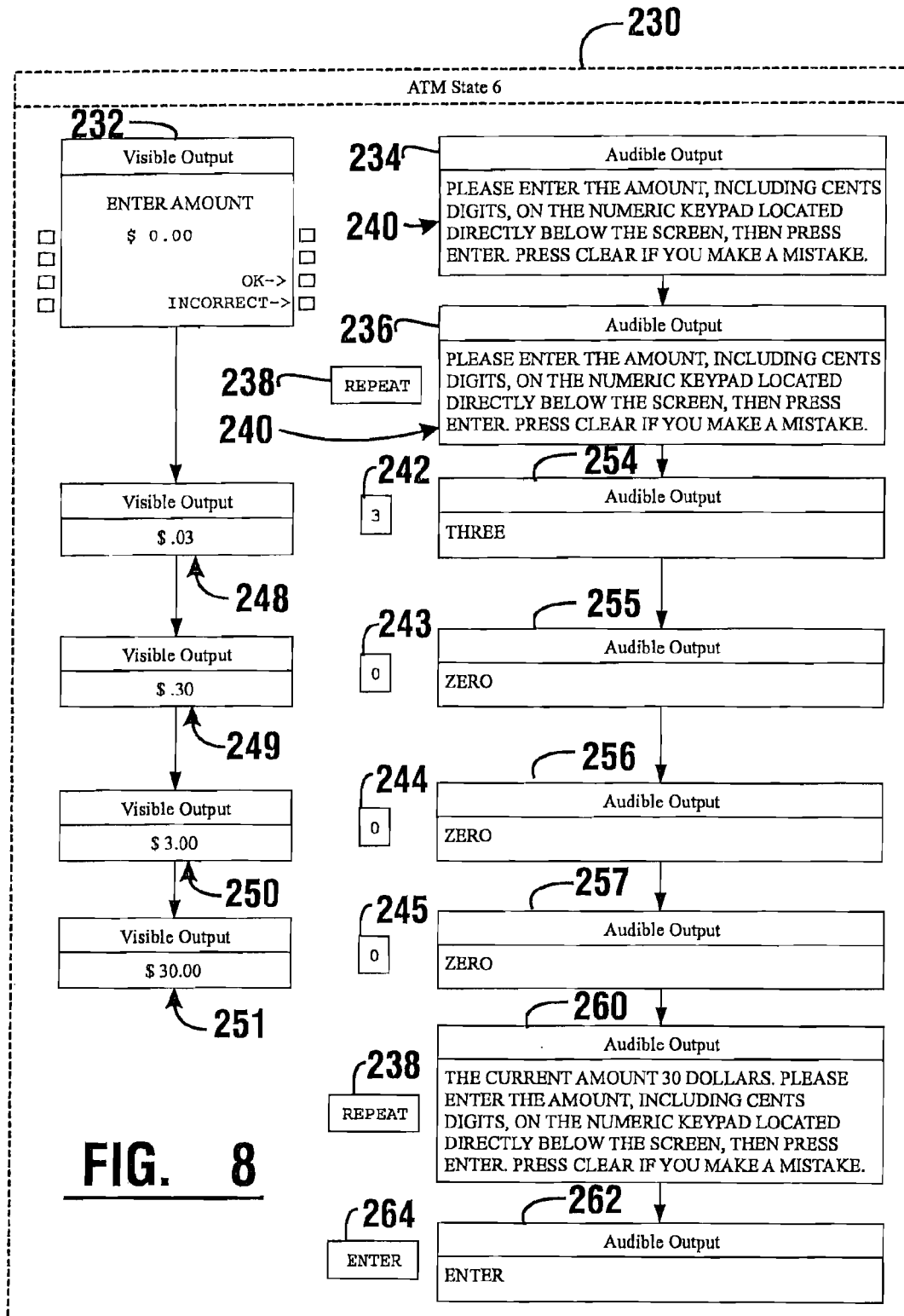

In this described exemplary embodiment, the five "5" key 218 corresponds to the selection of another amount for a withdrawal. When this key is pressed, while the automated banking machine is in the fifth state, the automated banking machine is operative to cause the automated banking machine to change to a sixth state and is operative to produce a further audible output 220 which verbally describes this selection with a word such as "Other." As shown in FIG. 8, when the exemplary automated banking machine is in a sixth state 230, the automated banking machine may be operative to enable the consumer to enter a specific amount of cash to withdraw, which amount may be other than one of the predetermined amounts previously presented. Here the automated banking machine may be operative to produce a visible output 232 which requests that the consumer enter an amount for the withdrawal in a currency such as dollars. The exemplary automated banking machine may further be operative to produce an audible output 234 which verbally requests that the consumer enter an amount which includes a fractional currency portion such as cents on the keypad.

If for some reason the consumer did not hear or understand all of the verbal instructions 240 of the audible output 234, the exemplary automated banking machine may be operative to enable the consumer to cause the automated banking machine to repeat the verbal instructions 240. In an exemplary embodiment, the automated banking machine may be operative to produce a further audible output 236 which includes a repeat of the verbal instructions 240 responsive to the consumer pressing a repeat key 238 of the keypad. If the repeat key is pressed before the verbal instructions 240 in the audible output 234 have completed, the exemplary automated banking machine may be operative to interrupt the audible output 234 and immediately begin outputting the further audible output 236. The further audible output 236 may then repeat the verbal instructions 240 from the beginning. In other exemplary embodiments, the automated banking machine may be operative to produce further audible outputs 236 which include a repeat of the verbal instructions 240 responsive to actuation of any unused key of the keypad which is not associated with another function or a selection available in the current state of the automated banking machine.

When the consumer enters an amount of a withdrawal by pressing the number keys 242-245, the exemplary embodiment of the automated banking machine may be operative to update the visible output 232 to produce visual outputs 248-251 with indicia representative of the current amount entered. In addition the automated banking machine may be operative to produce further audible outputs 254-257 which verbally describe the number associated with the key that was pressed. In the exemplary embodiment, as each key is pressed, the automated banking machine may be operative to determine a new current amount of value. The last two keys pressed may correspond to the fractional portion of the amount such as the cents portion in U.S. currency. The current amount may be stored in a memory or buffer in operative connection with the computer of the automated banking machine. Pressing the repeat key 238 while a withdrawal amount has been or is being entered, may cause the automated banking machine to produce a further audible output 260 which verbally indicates the current amount stored in the memory of the automated banking machine. In an exemplary embodiment, the audible output 260 may also include a repeat of the verbal instructions 240.

Figure 9:
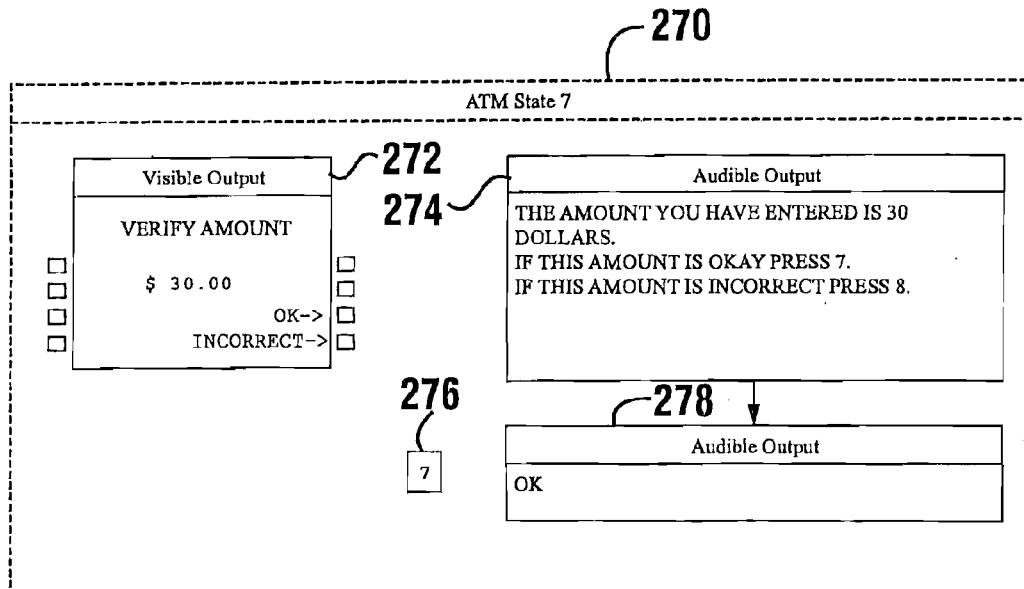

When the consumer has completed entering an amount, the consumer may press the enter key 264. Pressing the enter key may cause the automated banking machine to change to a seventh state and produce another audible output 262 which verbally describes that the enter key has been pressed. FIG. 9 represents the automated banking machine in a seventh state 270. Here the exemplary embodiment of the automated banking machine may be operative to produce a visible output 272 which requests that the consumer verify that the amount entered in the preceding state is correct. The automated banking machine may also be operative to produce an audible output 274 which verbally indicates the current amount entered and requests that the consumer press keys of the keypad to verify that the amount is either correct or incorrect. In this described exemplary embodiment, the consumer may verify the amount by pressing the seven "7" key 276 of the keypad. When the seven "6" key is pressed, the automated banking machine may be operative to produce an audible output 278 that verbally indicates a description of the selection by outputting a word such as "Ok."

Figure 10:
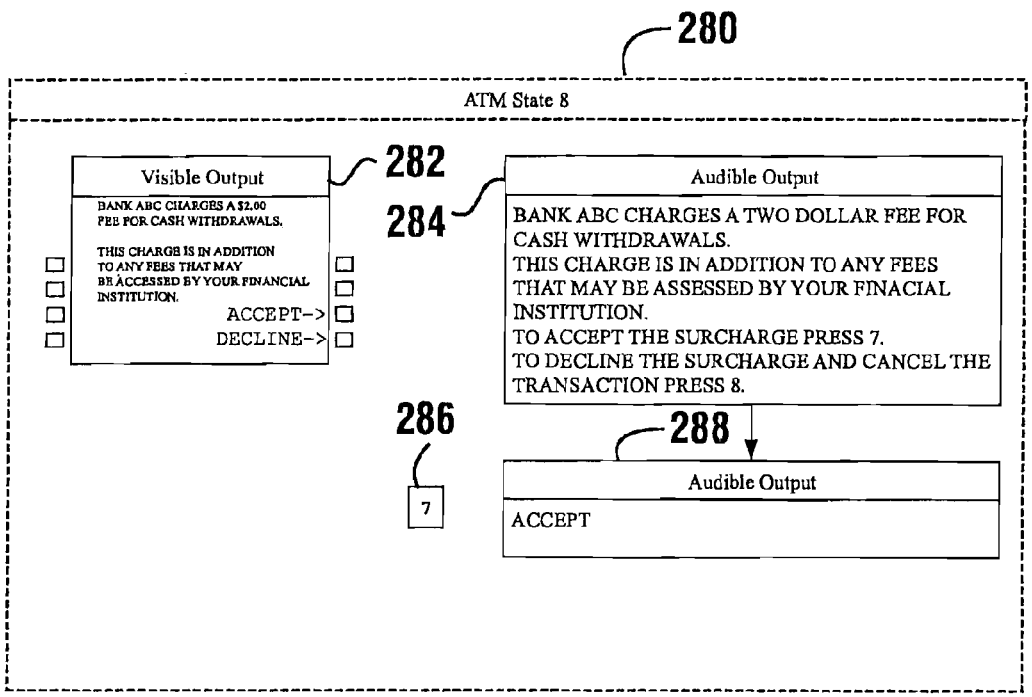

Once an amount has been verified by the consumer, if the automated banking machine is configured to charge a surcharge for the transaction, the automated banking machine may change to a further state such as the eighth state 280 shown in FIG. 10. Here the exemplary automated banking machine may be operative to produce a visible output 282 which discloses the fee for the withdrawal and requests that the user accept or decline the surcharge. The automated banking machine may further be operative to produce an audible output 284 which verbally describes the fee and indicates which keys of the keypad may be pressed in order to accept or decline the surcharge.

Figure 11:
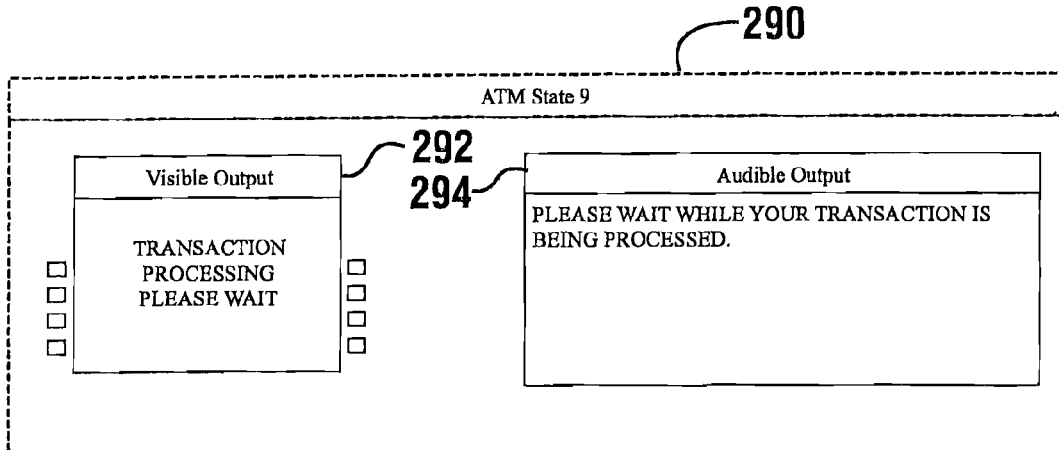
Figure 12:
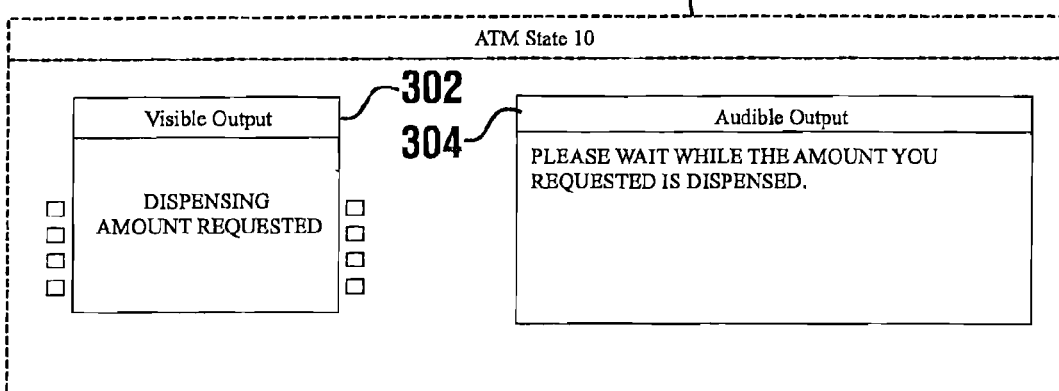

If the consumer accepts the charge by pressing the seven "7" key 286 for example, the automated banking machine may be operative to produce the further audible output 288 which verbally indicates that the user has accepted the surcharge by outputting a word such as "Accept." Once a consumer has accepted the surcharge (if applicable for the transaction), the exemplary automated banking machine may be operative to change to a ninth state 290 represented in FIG. 11 in which the automated banking machine produces both a visible output 292 and an audible output 294 which indicates that the transaction is being processed. Once the withdrawal has been authorized, the automated banking machine may be operative to change to a tenth state 300 represented in FIG. 12. In this state the exemplary embodiment of the automated banking machine may produce both a visible output 302 and an audible output 304 which indicate that the automated banking machine is in the process of dispensing the requested amount.

Figure 13:
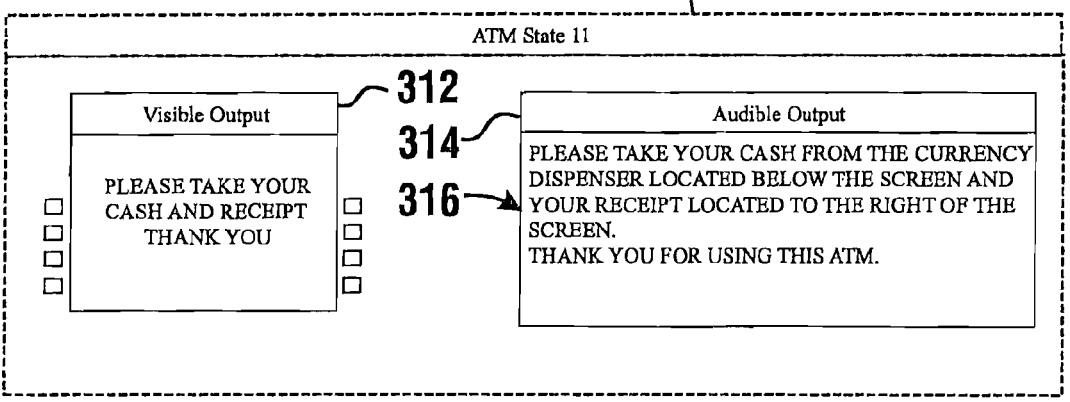

Once the exemplary embodiment of the automated banking machine has dispensed an amount of cash with the cash dispenser that corresponds to the requested amount, the automated banking machine may be operative to change to an eleventh state 310 as represented in FIG. 13. In the eleventh state the automated banking machine may be operative to produce both a visible output 312 and an audible output 314 which indicate that the consumer may take the dispensed amount of cash and a receipt from the automated banking machine. In addition, the verbal instructions 316 of the audible output may further describe the locations of the opening through which cash is delivered and the opening through which a receipt is delivered on the automated banking machine.

Once the transaction function has been completed, the exemplary embodiment of the automated banking machine may return to a previous state such as the described third state 160 shown in FIG. 5 for selecting another transaction or the described first state 102 shown in FIG. 3 for attracting new consumers. It is to be understood that the described automated banking machine states, visible outputs, and audible outputs are examples of performing only one type of transaction with the exemplary embodiment. Other transaction functions for the described automated banking machine and alternative exemplary embodiments of the automated banking machine may have additional and/or other types of automated banking machine states, visible outputs, and audible outputs.

In some exemplary embodiments, pre-existing automated banking machines which do not offer a user interface for the visually impaired may be upgraded to include some or all of the previously described features. Such an upgrade may include installing new terminal control software that is operative to cause the computer to direct the previously described audible outputs through a sound system device of the automated banking machine. Such upgraded terminal control software may further be operative to cause the automated banking machine to repeat verbal instructions, provide verbal help for selections, and/or change the volume of the audible output as described previously.

Figure 14:
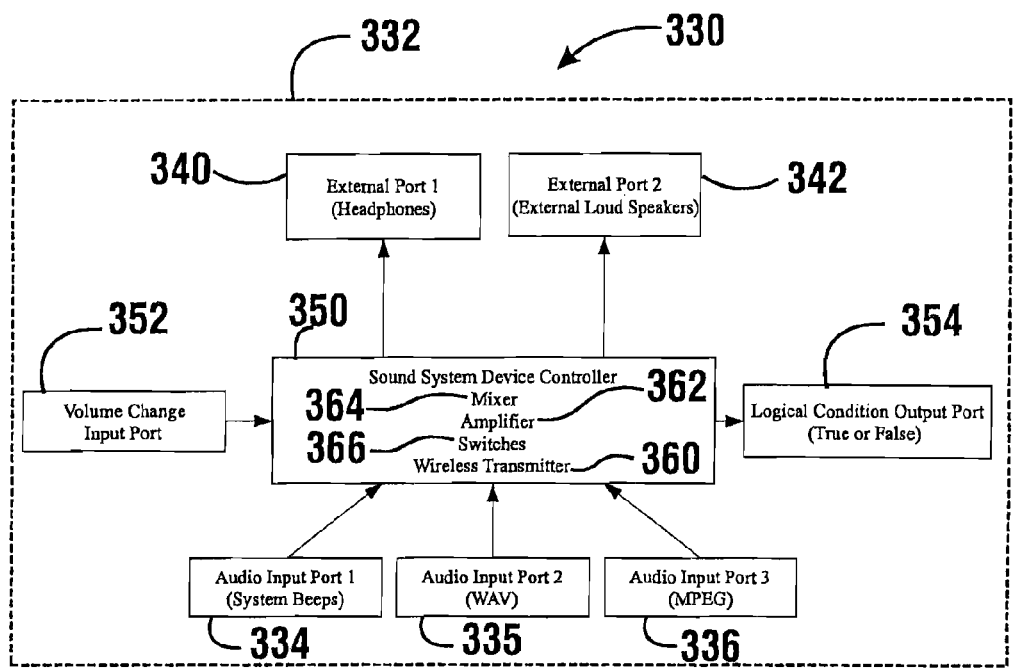
FIG. 14 is a schematic view representative of an exemplary audio system.

In addition such an upgrade of a pre-existing automated banking machine may include the installation of an audio system that is operative to further enable an automated banking machine to have some or all of the previously described features. FIG. 14 shows an example of an audio system 330 which is adapted to provide an automated banking machine with support for headphones 340 using an exemplary embodiment of a sound system device 332. The sound system device 332 may be adapted to accept one or more audio signals through audio input ports 334-336. Such input ports may be connected to the output ports of one or more audio output devices of the automated banking machine. For example such audio output devices of an automated banking machine may include a sound card that is operative responsive to operation of the computer associated with the automated banking machine to produce sound signals from WAV or MPEG files. In addition the automated banking machine may include audio output devices for generating audio signals with beeps and other prompting sounds to assist a consumer in operating the automated banking machine. Also the exemplary automated banking machine may include a text-to-speech synthesizer audio output device which is operative to produce audio signals with verbal instructions responsive to alphanumeric text-based instructions included in visual display outputs.

The exemplary sound system device 332 may include a controller 350 that is operative to manipulate one or more audio signals individually through the audio input ports 334-336. The controller 350 may include an amplifier 362 and mixing circuits 364 which are operative to selectively amplify and mix the audio input signals together to produce one or more amplified audio signals. Such amplified audio signals may be selectively directed by the controller 350 through one or more of the external ports 340, 342 of the sound system device. In an exemplary embodiment, the external ports 340, 342 correspond to speaker ports that are adapted to releasably connect to headphones and external loudspeakers. In the exemplary embodiment, the sound system device 332 may include one or more selectable adjustable switches 366 such as jumpers, dip switches, or other electronic switches which can be configured to set relative amplification and other characteristics for mixing one or more audio signals received from the audio input ports 334-336.

In an exemplary embodiment of the sound system device 332, the controller may be in operative connection with a volume change input port 352. The volume change input port 352 may be operative to receive electrical signals responsive to the operation of one or more volume controls such as a momentary switch, key, button or other consumer accessible switch. The controller 350 may be configured to cycle through one of a plurality of volume levels responsive to the electrical signals received from the operation of the volume control. The controller 350 may be operative to amplify the amplified audio signals responsive to the currently selected volume level. When the volume level reaches a maximum level, the exemplary controller may be operative to change the volume level to a predetermined minimum level responsive to the next electrical signal received from operation of the volume control.

In this described exemplary embodiment, the automated banking machine may include a volume control such as a button adjacent the keypad which is in operative connection with the volume change input port 352 of the sound system device 332. However, in other exemplary embodiments, the controller may be operative to receive volume changing signals from the computer of the automated banking machine. Terminal control software may be configured to detect events such as the clicking of a pound "#" key of the keypad and cause the computer to output a volume changing signal to the sound system device.

As discussed previously, the sound system device may be operative to mute amplified audio signals being directed through the external port 342 for external loudspeakers, responsive to the sound system device detecting the connection of headphones to the external port 340 for headphones. In an exemplary embodiment the controller 350 may be operatively configured to detect the impedance change across the external port 340 when headphones are electrically connected to the external port. In the exemplary embodiment when the connection is detected, the controller 350 may be operative to switch off any amplified audio signals being directed to the external port 342 for the external loudspeakers.

In addition, upon detection of the connection of the headphones the controller 350 may be operative to change the volume level of the amplified audio signals being directed to the external port 340 for the headphones to a predetermined level selected from one of the plurality of volume levels produced by the sound system device. Such a predetermined level may be configured with a jumper, dip switch, or other selectable switch associated with the sound system device. The predetermined level for example may be set to a volume level that is loud enough to be capable of being heard by almost all consumers, but is sufficiently low to be unlikely to cause discomfort to the majority of consumers using headphones with an automated banking machine.

In the exemplary embodiment, the controller may further be operative to detect when the headphone has been disconnected from the external port 340 for the headphones. When this occurs the controller may be operative to mute the amplified audio signals to the external port 340 for the headphone and institute the delivery of amplified audio signals to the external port 342 for external loudspeakers.

Also, in the exemplary embodiment, the controller 350 may be in operative connection with a logical condition output port 354 that is adapted to communicate with the computer. The controller 350 may be operative responsive to the detection of the headphones connected to the external port 340 for the headphones, to set the logical condition output port 354 to an electrical condition representative of true or on. When the controller 350 detects that the headphones are no longer connected to the external port 340 for headphones, the controller may be operative to set the logical condition output port 354 to an electrical condition representative of false or off.

In the exemplary embodiment, the computer of the automated banking machine may be configured to poll or monitor the condition of the logical condition output port 354. The terminal control software may be configured to turn on or off audible outputs being directed to the audio input ports 334-336 of the sound system responsive to the current condition of the logical condition output port 354. Thus for example, when the headphones are not attached, the exemplary automated banking machine may be configured to output system beeps and other prompting sounds through the external loudspeakers. However, when headphones are connected and the condition of the logical condition output port 354 changes to true or on, the exemplary terminal control software may be programmed to begin producing audio output with verbal instructions for operating the machine which is directed to the headphones.

In further alternative exemplary embodiments, the sound system device may further include a wireless transmitter 360. Such a transmitter may be operatively configured to transmit a wireless audio signal through an external port of the sound system device. Such a wireless audio signal may be received by a wireless receiver of the consumer such as wireless headphones or other suitable external device usable by the consumer for receiving outputs from the automated banking machine.

In alternative embodiments, the wireless audio signal may be encrypted by the automated banking machine to minimize possible eavesdropping on the transaction by a third party. Such encryption may include a handshaking protocol between the automated banking machine and the headphones or other wireless receiver device of the consumer which verifies that the consumer currently accessing the automated banking machine is the only party that can decipher the audio signals in the wireless transmission from the automated banking machine. For example, in one exemplary embodiment, wireless audio signals between the headphones and the automated banking machine may be transmitted using wireless network technology such as Bluetooth or IEEE 802.11.

In such embodiments, the automated banking machine may output to each consumer within range of the automated banking machine a verbal message which includes a unique session code. When the consumer has access to the machine, the consumer can enter their unique access code before entering a PIN. Based on the unique access code entered, the automated banking machine may then direct the audio signals related to operating the automated banking machine only to the set of wireless headphones which originally received the access code from the automated banking machine.

In further exemplary embodiments, the automated banking machine may be configured to direct private wireless audio signals to the headphones or other receiver device of the consumer based on information retrieved from the card or other input used to access the automated banking machine by the consumer. For example, such information from or correlated with data on the card or other input may enable the automated banking machine to retrieve or determine a private network address, encryption key, digital certificate, or other information associated with the headphones of the consumer, which may be used by the automated banking machine to establish secure and private communications with headphones or other wireless devices of the consumer.

In further alternative exemplary embodiments, the handshaking protocol between the automated banking machine and the wireless headphones or receiving device used by the consumer may be based on a biometric input received from the consumer currently accessing the automated banking machine. Such biometric input for example may include a fingerprint scan, facial recognition system or other biometric scan of the consumer. The automated banking machine may then selectively send private wireless audio signals only to that set of headphones which is operatively configured with information that corresponds to the biometric input corresponding to the particular user.

Thus the new automated banking machine audible user interface system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
    an automated banking machine sound system apparatus that is configured to be installed in an automated banking machine that is operative responsive at least in part to data read from data bearing records to cause financial transfers, wherein the machine includes:
        a card reader, wherein the card reader is operative to read card data from user cards, wherein the card data corresponds to financial accounts; and
        a display;
        a cash dispenser;
        a keypad;
        a receipt printer; and
        a headphone jack, wherein the headphone jack receives electrical audio output signals from the automated banking machine and responsive at least in part to the audio output signals is operative to provide jack signals usable to produce via headphones connected with the headphone jack audible instructions describing manual inputs receivable by the automated banking machine and operative to cause the automated banking machine to carry out transaction functions;
    wherein the sound system apparatus includes at least one controller, wherein the controller is configured to receive the audio output signals;
    wherein the at least one controller is operative responsive at least in part to audio output signals to cause the sound system apparatus to output wireless communications receivable with an external wireless device that is operative to output audible sounds corresponding to such audible instructions.

2. The apparatus according to claim 1, wherein the sound system apparatus includes a wireless communication device, wherein the at least one controller is operative to cause the wireless communication device to operate in order to output the wireless communications.

3. The apparatus according to claim 2, wherein the at least one controller is operative to determine information including an address associated with the external wireless device responsive at least in part to communications with the automated banking machine.

4. The apparatus according to claim 3, wherein the at least one controller is operative responsive at least in part to the determined address to operate the wireless communication device to output the wireless communications.

5. The apparatus according to claim 2, wherein the external wireless device includes a headphone.

6. The apparatus according to claim 2, wherein the at least one controller is operative to carry out a handshaking protocol with the external wireless device to establish wireless encrypted communications with the external wireless device, which protocol enables the external wireless device to decrypt the audio signals included in the wireless encrypted communications.

7. The apparatus according to claim 6, wherein the at least one controller is operative to receive a code from the automated banking machine, wherein the at least one controller is operative to cause the wireless communication device to communicate the code to the external wireless device in order to establish with the external wireless device, the wireless encrypted communications.

8. The apparatus according to claim 6, wherein the sound system apparatus includes a card that is installable in the automated banking machine.

9. The apparatus according to claim 6, wherein the automated banking machine includes at least one processor in operative connection with the card reader, the display, the cash dispenser, the keypad, the receipt printer, and the sound system apparatus, wherein the at least one processor is operative to cause the at least one controller to cause the wireless communication device to establish wireless encrypted communications with the external wireless device responsive at least in part to data read from a user card through operation of the card reader.

10. The apparatus according to claim 9, wherein the at least one processor is responsive at least in part to data read from the user card to determine an encryption key associated with the external wireless device, wherein the at least one processor is operative to use the encryption key to cause the at least one controller to cause the wireless communication device to establish the wireless encrypted communications with the external wireless device.

11. The apparatus according to claim 9, wherein the at least one processor is responsive at least in part to data read from the user card to determine a digital certificate associated with the external wireless device, wherein the at least one processor is operative to use the digital certificate to cause the at least one controller to cause the wireless communication device to establish the wireless encrypted communications with the external wireless device.

12. The apparatus according to claim 9, wherein the at least one processor is operative to cause the at least one controller to cause the wireless communication device to communicate a unique code to the external wireless device, wherein responsive at least in part to the automated banking machine receiving an input of the unique code, the at least one processor is operative to cause the at least one controller to cause the wireless communication device to establish the encrypted wireless communications with the external wireless device.

13. The apparatus according to claim 9, wherein responsive at least in part to a biometric input received with the automated banking machine, the at least one processor is operative to cause the at least one controller to cause the wireless communication device to establish the encrypted wireless communications with the external wireless device.

14. The apparatus according to claim 9, wherein the automated banking machine includes at least one external loudspeaker, wherein the at least one processor is operative to cause the at least one controller to cause the at least one external loudspeaker to produce audible outputs, wherein responsive at least in part to establishing wireless communications with the external wireless device, the at least one controller is operative to mute audible outputs through the at least one external loudspeaker.

15. Apparatus comprising:
- an automated banking machine sound system apparatus that is configured to be installed in an automated banking machine, wherein the automated banking machine is operative responsive at least in part to data read from data bearing records to cause financial transfers and includes:
  - a plurality of input devices including:
    - a card reader, wherein the card reader is operative to read card data from user cards, wherein the card data corresponds to financial accounts; and
    - a keypad;
  - a display;
  - a cash dispenser; and
  - a receipt printer; and
  - at least one processor, wherein the at least one processor is operative to communicate with the input devices, the display, the cash dispenser, and the receipt printer, wherein the at least one processor is operative responsive at least in part to an input received through operation of at least one of the input devices to cause electrical output audio signals to be produced, wherein the electrical output audio signals are usable to produce verbal instructions describing respectively different inputs that when received through operation of the at least one input device, cause the automated banking machine to carry out respectively different functions;
  - wherein the sound system apparatus includes at least one controller and at least one wireless communication device,
  - wherein the at least one controller is operative responsive at least in part to the electrical output audio signals to cause the wireless communication device to output wireless communications receivable with an external wireless device, wherein the wireless device is operative to output audible sounds corresponding to the verbal instructions.

16. The apparatus according to claim 15, wherein the sound system apparatus is operative to connect to a headphone jack included in the automated banking machine.

17. The apparatus according to claim 16, wherein the at least one controller is responsive at least in part to communications with the automated banking machine to cause the sound system apparatus to output the output audio signals through the headphone jack.

18. The apparatus according to claim 15, wherein the sound system apparatus includes a card that is installable in the automated banking machine.

19. The apparatus according to claim 15, wherein the external wireless device includes a headphone.

20. A method of updating an automated banking machine that is operative responsive at least in part to data read from data bearing records to cause financial transfers and includes:
- a card reader, wherein the card reader is configured to read card data from user cards,
- wherein the card data corresponds to financial accounts;
- at least one input device;
- a display;
- a cash dispenser,
- a receipt printer; and
- at least one processor, wherein the at least one processor is configured to operate responsive at least in part to an input received through operation of the at least one input device to cause electrical output audio signals to be produced, wherein the electrical output audio signals are usable to produce verbal instructions, wherein the verbal instructions describe a plurality of different inputs that when received through operation of the at least one input device, cause the automated banking machine to carry out different functions;

wherein the method comprises:
- a) installing an automated banking machine sound system apparatus in the automated banking machine, wherein the sound system apparatus includes at least one controller and at least one wireless communication device; and
- b) operatively connecting the at least one controller and the at least one processor such that the at least one controller is configured to receive the electrical output audio signals, wherein the at least one controller is configured to operate responsive at least in part to the electrical output audio signals, to cause the wireless communication device to output wireless communications receivable with an external wireless device configured to output audible sounds corresponding to the verbal instructions.

* * * * *